United States Patent [19]
Kleffner

[11] Patent Number: 5,734,711
[45] Date of Patent: Mar. 31, 1998

[54] TELECOMMUNICATION SYSTEM WITH ENERGY-SAVING MODE

[75] Inventor: Werner Kleffner, Borchen, Germany

[73] Assignee: Siemens Aktiengesellschaft, Munich, Germany

[21] Appl. No.: 440,526

[22] Filed: May 12, 1995

[30] Foreign Application Priority Data

May 20, 1994 [DE] Germany .................. 44 17 780.1

[51] Int. Cl.$^6$ .................................................. H04M 3/00
[52] U.S. Cl. .................. 379/323; 379/318; 379/324; 379/413; 395/750
[58] Field of Search .................. 379/322, 323, 379/324, 412, 413, 318; 395/750

[56] References Cited

U.S. PATENT DOCUMENTS 4,539,437  9/1985  Giacopelli et al. .............. 379/412 X
5,017,799  5/1991  Fishman ......................... 379/324 X
5,457,741  10/1995  Sonobe ......................... 379/324 X
5,461,266  10/1995  Koreeda et al. ................. 395/750 X

OTHER PUBLICATIONS

"ISDN in the Office–HICOM", special issue of Telcom Report and Siemens Magazine Com., Dec. (1985) pp. 1–111.

*Primary Examiner*—Harry S. Hong
*Attorney, Agent, or Firm*—Hill, Steadman & Simpson

[57] ABSTRACT

In a program-controlled telecommunication system (KS), at least sub-areas (SLM1..n) are controlled into an energy-saving mode with reduced energy consumption using a central controller (ZS) and additional controllers (SM) given the presence of energy-saving information (ei). The energy-saving information (ei) are formed, for example, using a timer (UM) in the telecommunication system (KS) and using an implemented energy-saving routine (ESR). A telecommunication system (KS) fashioned in this way can be controlled into an energy-saving mode, for example during the night or over weekends.

18 Claims, 1 Drawing Sheet

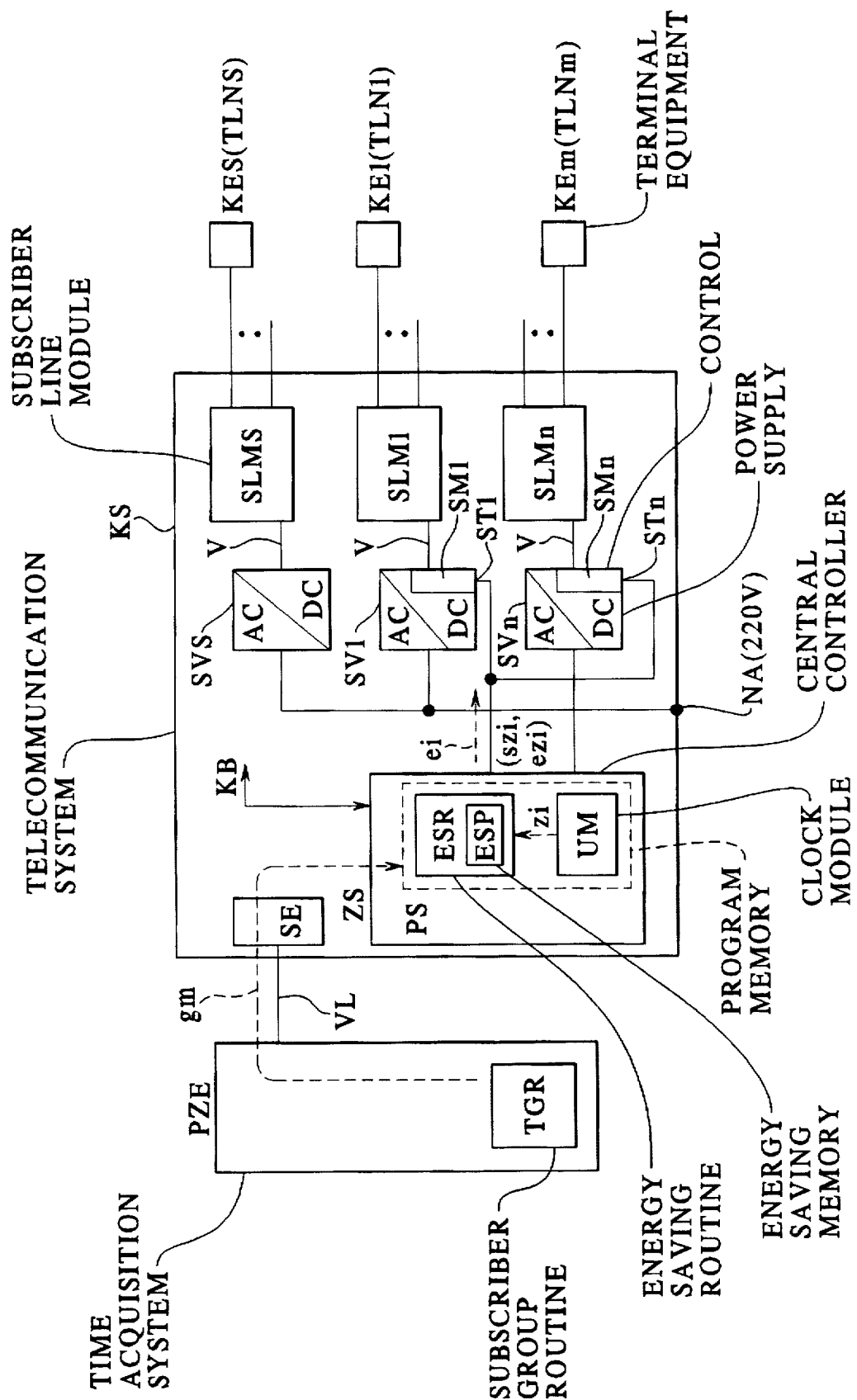

TELECOMMUNICATION SYSTEM WITH ENERGY-SAVING MODE

BACKGROUND OF THE INVENTION

The present invention is directed to a telecommunication system having at least one control means and one energy supply means.

Such a telecommunication system is known, for example, from the publication "ISDN in the Office-HICOM", special issue of Telecom Report and Siemens Magazine Com, (1985). The telecommunication system is formed by a central control means, by a switching network and by periphery subscriber line modules and service units. Analog or digital communication terminal equipment can be connected to the subscriber line modules. Such telecommunication systems are constantly in operation because of the high availability demands and consequently have a continuous, high energy consumption.

SUMMARY OF THE INVENTION

It is an object of the present invention to reduce the energy consumption of telecommunication systems. In general terms the present invention is a telecommunication system having at least one control means and at least one energy supply means. Additional control means and the at least one control means are fashioned such that at least a sub-area of the telecommunication system is controlled into at least one energy-saving mode with reduced energy consumption given the presence of energy-saving information.

An important feature of the inventive telecommunication system is that additional control means and the control means of the telecommunication system are fashioned such that at least a sub-area of the telecommunication system is switched into at least one energy-saving mode that reduces energy consumption given the presence of energy-saving information. In particular, sub-areas of the subscriber line modules as well as components or sub-areas of the components that can be in turn switched into a normal operating mode after being switched into an energy-saving mode with reduced energy consumption are to be considered as sub-areas of the telecommunication system. Under certain conditions, a nearly complete switching of the telecommunication system into the energy-saving mode is also possible.

The energy-saving mode for sub-areas of the telecommunication system is advantageously effected using additional means by a control of the at least one sub-area into a current-free condition, into a standby condition and by conditions wherein the sub-areas are operated with reduced feed voltages or with reduced clock rates. In these developmental versions, the control means are to be correspondingly fashioned, that is by appropriate switch means and by corresponding regulating devices particularly for reducing the feed voltage and the clock rates.

According to another advantageous development of the inventive telecommunication system, the energy-saving mode is realized using additional means that periphery equipment of the telecommunication system are controlled current-free. Periphery equipment of telecommunication systems are represented, in particular, by subscriber line modules to which analog or digital communication terminal equipment can be connected. Due to the great number of these peripheral equipment, switching these current-free produces an especially high saving in energy consumption.

Internal or external means are provided for forming the energy-saving information. These energy-saving information are particularly represented by time information with which the telecommunication system is controlled from a normal operating mode into an energy-saving mode and vice versa. According to an advantageous development of the inventive telecommunication system, the internal or external means for forming energy-saving information are realized by a timer means and are fashioned such that the energy-saving information is represented by a starting point and/or ending point in time information indicating the starting point in time and/or by such an information indicating the ending point in time of an energy-saving mode with reduced energy consumption. Such a timer means is usually available in telecommunication systems and is merely supplemented by an energy-saving routine realized in program-oriented fashion with which the starting point in time and/or ending point in time information are formed. The starting point in time and ending point in time information define a time range wherein the telecommunication system is controlled into an energy-saving mode. This time range, for example, occurs during the night or on weekends wherein only individual terminals remain activated for the communication of, for example, telefax information. The timer means can be advantageously arranged in a higher-ranking, central operating location and the starting point in time and/or ending point in time information that are formed are communicated to the appertaining telecommunication systems. The operating location, for example, is represented by remote administration and maintenance equipment of a public or private communication network in which starting point in time and/or ending point in time information are formed, for example during the night or on weekends, and are communicated to the telecommunication systems allocated to this operating location. For example, sub-areas of the peripheral equipment can be controlled into a current-free or into a stand by mode in the appertaining telecommunication systems using these starting point in time and/or ending point in time information. Alternatively or, respectively, additionally, a reduction of the clock rates of the clock signals that clock the telecommunication system or a reduction of the operating voltages for significant areas is advantageous.

According to another advantageous development of the inventive telecommunication system, the starting point in time and ending point in time information are formed in a personal time-acquisition system dependent on the presence or absence of subscribers allocated to the communication terminal equipment and are communicated to the appertaining communication system. In this advantageous development, a personal time-acquisition system is incorporated into the telecommunication system. The presence or, respectively, absence of the subscriber allocated to a communication equipment is determined using the personal time-acquisition system. The presence check is implemented, for example, by reading magnetic strips of identification cards. When, for example, one or more subscribers or a subscriber group allocated to a subscriber line module is or are absent, then starting point in time information is formed and is communicated to the telecommunication system. The appertaining subscriber line module in the latter is controlled into an energy-saving mode, for example by reducing the operating voltage. When the presence of a subscriber or of a subscriber of the group is identified, then an ending point in time information is formed and communicated to the communication system, whereupon the appertaining sub-areas of the communication system are driven into normal mode therein.

According to another advantageous development of the inventive telecommunication system, the starting point in time or ending point in time information is formed dependent on the presence or absence information communicated from the communication terminal equipment. Given, for example, a planned absence of the subscriber from the communication terminal equipment, log off information is formed in the telecommunication terminal equipment following an input by the subscriber and is communicated to the telecommunication system. Following thereupon, the "sub-energy" allocated to the appertaining communication terminal is controlled into an energy-saving mode. Analogous thereto, a periphery equipment, for example a subscriber line module, is controlled into an energy-saving mode insofar as respective log off information was formed and communicated from the group of communication terminal equipment allocated to the periphery equipment. Considerable energy savings can be achieved by controlling the respective line units into an energy-saving mode, for example on the basis of a far-reaching disconnect of the energy supply.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing and in which:

The single FIGURE depicts a telecommunication system according to the present invention.

DESCRIPTION OF THE PREFERRED EMBODIMENT

The single FIGURE shows a telecommunication system KS that is formed by a central controller ZS as well as by subscriber line modules SLM1...n, S. The message and signaling information exchange between these components of the telecommunication system KS is effected via a communication bus KB. Let it be assumed for the exemplary embodiment that these subscriber line modules SLM1...n, S each have respective power supply SV1...n, S allocated to them. The power supplies SV1..n, S are conducted via appropriate connections to a 220 volt mains connection NA via which the telecommunication system KS is supplied with energy. The alternating voltages AC of the 220 volt mains connection NA are converted into dc voltages DC in the power supplies SV1..n, S. The plurality and magnitude of the dc voltages are matched to the requirements of the subscriber line modules SLM1..n, S.

Let it also be assumed for the exemplary embodiment that respective communication terminal equipment KE1..n can be connected to the subscriber line modules SLM1..n that can be controlled into an energy-saving mode and that further communication terminal equipment KES are connectable to a further subscriber line module SLMS that cannot be driven into an energy-saving mode. In particular, the further communication terminal equipment KES represent communication terminal equipment KES that must always be kept in operation, for example facsimile devices or emergency call devices. Respective control means SM1..n with which the dc voltages DC can be disconnected or, respectively, significantly lowered are respectively provided in the power supplies SV1..n to which are allocated respective subscriber line modules SLM1..n that can be driven into an energy-saving mode. The control means SM1..3 contain, for example, electronic final control elements, for example transistors or, alternatively, relays.

The control means SM1..n each respectively have a control terminal ST1..n connected to the central controller ZS either individually or, in combination as shown in the single FIGURE.

An energy-saving routine ESR is provided in the program memory PS in the central control means ZS that, for example, is a microprocessor system SAB 80386 of Siemens AG. A clock module UM is also integrated in the program memory PS for the temporal control of the energy-saving routine ESR. Current time information $z_i$ are formed in this clock module UM that is usually present and are communicated to components of the communication system KS, to the energy-saving routine ESR as well. At predetermined points in time that are stored in an energy-saving memory ESP, starting point in time and/or ending point in time information $sz_i$, $ez_i$ are formed using the energy-saving routine ESP and are respectively communicated either to one or, as shown in the single FIGURE, to all power supply SV1..n that can be controlled into an energy-saving mode. These starting point in time and/or ending point in time information $sz_i$, $ez_i$ represent the setting information $e_i$ for the power supplies SV1..n. Using these setting information $e_i$, the power supplies SV1..n are both driven into an energy-saving mode by the starting point information $sz_i$, as well as, switched into the normal operating mode by the ending point in time information $ez_i$. In the best realization, the setting information $e_i$ are realized by two voltage levels that indicate the energy-saving mode or the normal operating mode to the respective control means SM1..n.

An annual energy saving of 2,000 kW/h in a telecommunication system can be achieved by driving the subscriber line modules SLM1..n into the energy-saving mode given a daily disconnect of the dc voltage DC, particularly during the night, this corresponding to a reduction of the energy consumption by approximately 25%. Further potential savings may be seen in controlling the telecommunication system KS into an energy-saving mode over weekends.

A more efficient control of the telecommunication system KS into an energy-saving mode can be achieved by connecting a personal time acquisition system PZE. The presence or, respectively, the absence of subscribers TLN1..n allocated to the communication terminal equipment KE1..n is acquired using a personal time acquisition system PZE, essentially by acquisition devices such as, for example, ID readers, etc. The presence or, respectively, absence of subscribers TLN1..n that are respectively allocated to a subscriber line module SLM1..n can be determined with a subscriber group routine TGR implemented in the personal time-acquisition system PZE. When the absence of all subscribers TLN1..m connected to a subscriber line module SLM1..n is found, then a group message GN is formed in the subscriber group routine TGR and is communicated to the central controller ZS of the telecommunication system KS. To this end, the personal time-acquisition system PZE is connected to an interface means SE of the telecommunication system KS via a connecting line VL. The group message gm is conducted to the energy-saving routine ESR in the central controller ZS and a setting information $e_i$ is formed in the energy-saving routine ESR dependent on the informational content of the group message gm and is communicated to the appertaining subscriber line module SLM1..n and the latter is driven into an energy-saving mode using the control means SM1..n. Analogous thereto, the presence of at least one subscriber TLN1..n whose allocated communication terminal equipment KE1..n or, respectively, subscriber line module SLM1..n is in an energy-saving mode is reported by a group message gm. On the basis of this group message gm, the appertaining subscriber line module SLM..n is subsequently returned into the normal operating mode. As a result of connecting a personal time-acquisition system, consequently, the respective subscriber line modules SLM1..n can be designationally driven into an energy-saving mode regardless of the time of day given the absence of the allocated subscribers TLN1..m. Further energy savings are thereby possible.

The invention is not limited to the particular details of the apparatus and method depicted and other modifications and applications are contemplated. Certain other changes may be made in the above described apparatus and method without departing from the true spirit and scope of the invention herein involved. It is intended, therefore, that the subject matter in the above depiction shall be interpreted as illustrative and not in a limiting sense.

What is claimed is:

1. A telecommunication system, comprising:
   at least one central control means connected to at least one energy supply means;
   internal or external means for forming energy-saving information represented by starting point in time information and/or ending point in time information indicating a starting point in time and/or an ending point in time;
   at least one additional control means connected to the at least one central control means;
   via the at least one additional control means and the at least one central control means, at least a sub-area of the telecommunication system is controlled into at least one energy-saving mode with reduced energy consumption in response to the energy-saving information supplied by the at least one central controller.

2. The telecommunication system according to claim 1, wherein the energy-saving mode with reduced energy consumption is realized with additional control means such that sub-areas of the telecommunication system are controlled into a current-free condition.

3. The telecommunication system according to claim 1, wherein reduced energy consumption is realized with additional control means such that sub-areas of the telecommunication system are controlled into a standby mode.

4. The telecommunication system according to claim 1, wherein the energy-saving mode with reduced energy consumption is realized with additional control means such that sub-areas of the telecommunication system are operated with reduced feed voltages.

5. The telecommunication system according to claim 1, wherein the energy-saving mode with reduced energy consumption is realized with additional control means such that sub-areas of the telecommunication system are operated with clock signals having reduce clock rates, said clock signals being supplied by the at least one central control means.

6. The telecommunication system according to claim 1, wherein the energy-saving mode with reduced energy consumption is realized with additional control means such that periphery equipment of the telecommunication system are controlled current-free, said periphery equipment respectively connected to the additional control means.

7. The telecommunication system according to claim 1, wherein the internal or external means for forming the energy-saving information in the telecommunication system is realized by an energy-saving routine and by a timer means.

8. The telecommunication system according to claim 7, wherein the timer means and the energy-saving routine are arranged in a higher-ranking, central operating location and the starting point in time information and/or the ending point in time information that are formed are communicated through an appertaining telecommunication systems.

9. The telecommunication system according to claim 7, wherein the starting point in time information and the ending point in time information are formed in a personal time-acquisition system dependent on presence or absence of subscribers allocated to communication terminal equipment that are connected to an appertaining telecommunication system, the starting point in time information and the ending point in time information being communicated to the appertaining telecommunication system.

10. The telecommunication system according to claim 9, wherein the starting point in time information and/or the ending point in time information are formed in the personal time-acquisition system dependent on the absence or presence of a subscriber group allocated to a periphery equipment and/or all subscribers.

11. The telecommunication system according to claim 7, wherein the telecommunication system is fashioned such that the starting point in time information or the ending point in time information are formed dependent on log-on or log-off information, respectively, communicated from communication terminal equipment connected to the telecommunication system.

12. The telecommunication system according to claim 11, wherein the starting point in time information and the ending point in time information are formed dependent on log-on or log-off information communicated from a group of communication terminal equipment connected to the telecommunication system, the group of communication terminal equipment having at least one peripheral equipment allocated thereto.

13. An energy-saving method for use in a telecommunication system having at least one central control means connected to at least one energy supply means, comprising the steps of:
   forming energy-saving information in the telecommunication system by an energy-saving routine and by a timer means, the energy-saving information being represented by starting point in time information and/or ending point in time information indicating a starting point in time and/or an ending point in time;
   providing additional control means connected to the at least one central control means;
   controlling at least a sub-area of the telecommunication system into at least one energy-saving mode with reduced energy consumption in response to energy-saving information supplied by the at least one central controller, the sub-area containing the additional control means.

14. The method according to claim 13, wherein the timer means and the energy-saving routine are arranged in a higher-ranking, central operating location and the starting point in time information and/or the ending point in time information that are formed are communicated through an appertaining telecommunication system.

15. The method according to claim 13, wherein the starting point in time information and the ending point in time information are formed in a personal time-acquisition system dependent on the presence of subscribers allocated to communication terminal equipment that are connected to an appertaining telecommunication system, and wherein the starting point in time and the ending point in time are communicated to the appertaining telecommunication system.

16. The method according to claim 15, wherein the starting point in time information and/or the ending point in time information are formed in the personal time-acquisition system dependent on the presence of a subscriber group allocated to a periphery equipment and/or all subscribers.

17. The method according to claim 13, wherein the starting point in time information and the ending point in time information are formed dependent on log-on and log-off information, respectively, communicated from communication terminal equipment connected to the telecommunication system.

18. The method according to claim 17, wherein the starting point in time information and the ending point in time information are formed dependent on the log-on and log-off information, respectively, communicated from a group of communication terminal equipment connected to the telecommunication system, the group of communication terminal equipment having at least one peripheral equipment allocated thereto.

* * * * *